May 17, 1932.  E. T. BURTON  1,858,237
SUBMARINE CABLE TELEGRAPH SYSTEM
Filed July 31, 1931  2 Sheets-Sheet 1
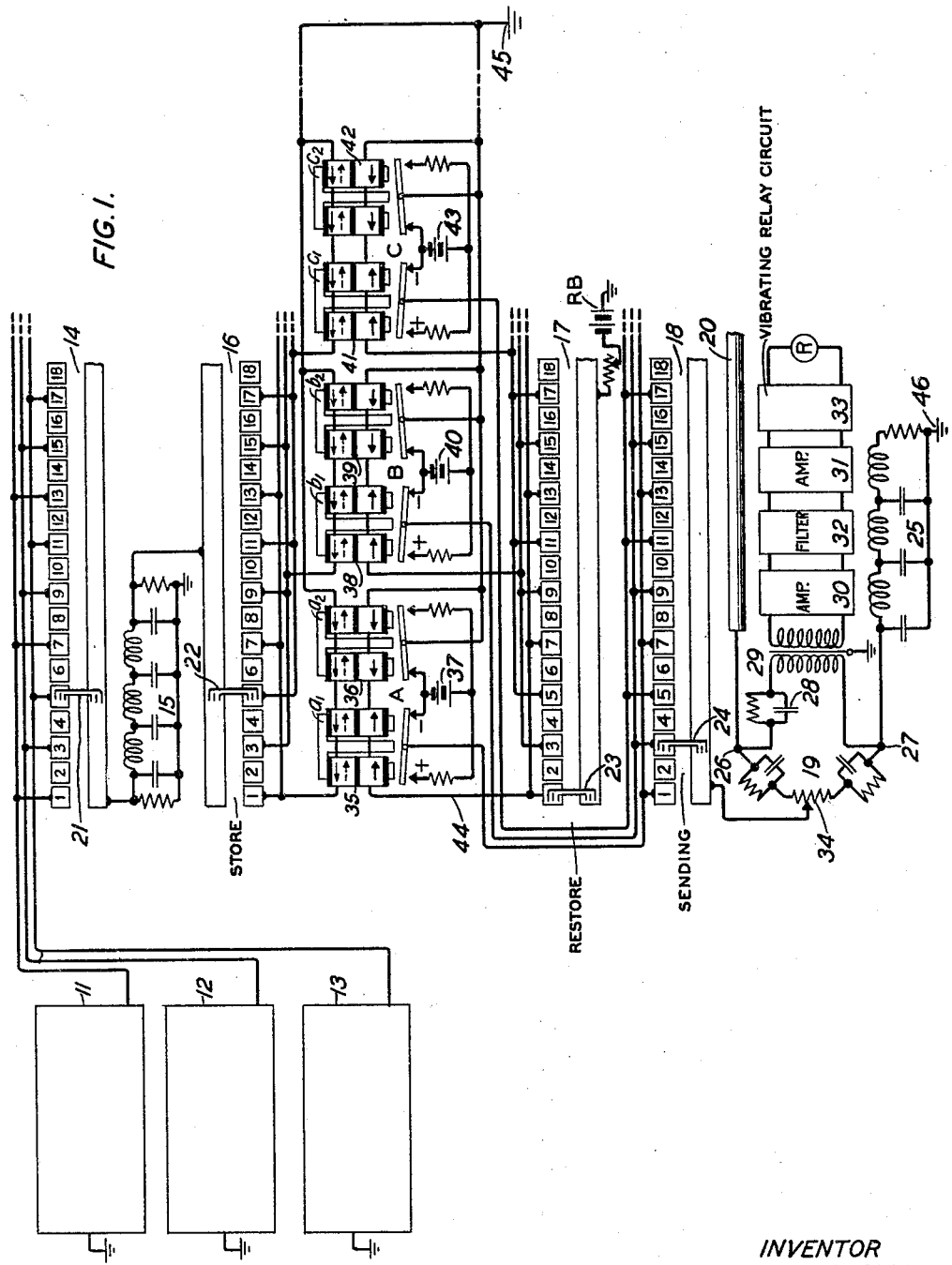
INVENTOR
E. T. BURTON
BY
J. W. Schmied
ATTORNEY

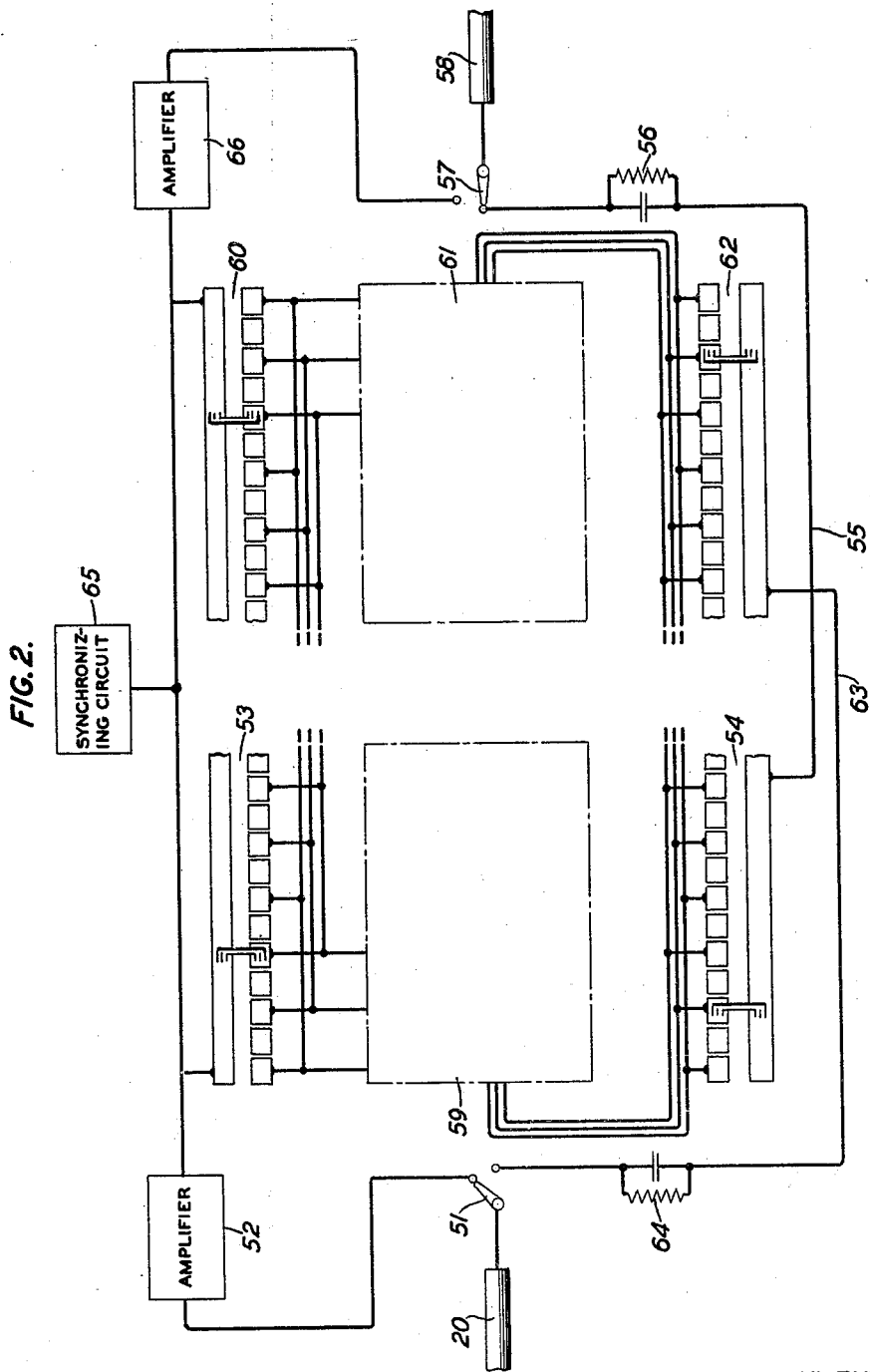

Patented May 17, 1932

1,858,237

UNITED STATES PATENT OFFICE

EVERETT T. BURTON, OF MILLBURN, NEW JERSEY, ASSIGNOR TO BELL TELEPHONE LABORATORIES, INCORPORATED, OF NEW YORK, N. Y., A CORPORATION OF NEW YORK

SUBMARINE CABLE TELEGRAPH SYSTEM

Application filed July 31, 1931. Serial No. 554,216.

This invention relates to submarine cable telegraph systems, particularly those systems adapted for high speed signaling.

An object of this invention is to increase the speed of transmission over a long submarine cable.

This object more specifically stated, is to eliminate signaling impulses of unit length at the sending end of a submarine cable telegraph system in which conditions are such that transmitted impulses of only two or more unit lengths are of sufficient strength to operate apparatus at the receiving end.

Another object is to reduce the number and magnitude of voltage changes in the transmitted signals and thus reduce, first, the cumulative unbalance due to the superposition of unbalanced impulses arising from different transmitted impulses, and second, the alternating current power applied to the cable with its attendant distortion and modulation with other signals and interference on other cable systems.

A further object is to obtain this result without eliminating from the signaling impulses impressed upon the line, those components which are effective at the receiver to produce accurate reception at a given speed of transmission.

In a submarine cable telegraph system employing a loaded cable, the unbalance due to the transmission of a single unit impulse is distributed over a considerable period of time, measured in terms of a dot impulse at a given signal frequency. This is due to the comparatively low velocity of propagation of signals over a loaded cable and the comparatively high speed of signaling. On account of the spreading out of the unbalance due to the transmission of a single unit impulse, the unbalances due to a succession of signal impulses constituting a message, will be superimposed, and the unbalanced peaks arising from various signal impulses will coincide or overlap. The resulting unbalance has a maximum amplitude greatly in excess of the maximum amplitude of the unbalance due to a single unit impulse transmitted by itself. It has been found that the most serious accumulations of unbalance of this sort are due to unbalance impulses separated by a time which bears a definite relation to the length of a signal impulse and the effect can be reduced by designing the artificial line so that various sections of networks of which the artificial line is composed, can be adjusted more closely than would be required if the unbalance for the single unit impulse alone were to be considered. The cumulative unbalance can be diminished by reducing the amplitude and frequency of occurrence of the changes of voltage involved in transmitting signals. The latter method of diminishing the cumulative unbalance is preferable in a system employing a two-unit code for transmission, wherein the signals are so modified in transmission that whenever a train of alternately positive and negative impulses of unit length are ordinarily transmitted, the cable is connected to earth for a period of the train. Consequently the succession of message impulses transmitted over the cable lacks the unit impulses of alternate polarities, but these impulses can be interpolated in their proper order in the message by a vibrating relay arrangement at the receiving end of the cable. It is obvious that in transmitting impulses of two or more units length, there are many fewer changes of voltages than with ordinary two-element or three-element signals, and the average change of amplitude in transmitting voltage as well as a number of changes is less than would be encountered if the impulses of unit length were transmitted.

This invention is particularly adaptable to duplex operated systems wherein the detrimental effect of unbalance due to hysteresis such as is found when the cable and the artificial line have different hysteresis characteristics, is reduced. A duplex operated system in which the unbalance due to hysteresis is compensated for is disclosed in United States Patent 1,753,336, granted to J. J. Gilbert on April 8, 1930. In that system two-element signals are transmitted through a network designed to suppress all frequencies at and above the dot frequency and to allow all other frequencies to pass. The frequencies passing through the network are received in a pair of "sending-on" relays which operate in response thereto and reproduce for transmission over the cable a signal wave of substantially square-topped shape. The signals of two or more units length are received in an amplifier wherein they are amplified to operate a receiving or recording device. A vibrating relay device at the receiving end, which operates in synchronism with the transmitting equipment at the sending end of the cable, is ordinarily arranged to produce unit impulses of alternate polarity, in a manner well known in the art, which control the receiving device during the period in which the receiving device is non-responsive to the incoming single waves, thereby replacing the unit impulses lost in suppressing the dot frequency. The signals passing through the "sending-on" relays from the filter network are necessarily somewhat rounded because of the elimination of high frequencies, and therefore the signals reproduced by the relays are shorter than their theoretical length and may probably show marked irregularities due to ordinary variations in apparatus adjustments.

According to the present invention, the difficulty of the arrangement disclosed in the Gilbert patent, supra, is eliminated by connecting the output of the low pass filter network to the windings of three pairs of storing relays, the connection being made through a set of distributor segments. Successive signals are respectively set up on the three sets of relays and a set of sending segments connect the three sets of relay contacts successively to the cable. In this way the cable is always connected to a set of relay contacts which are at rest during the full period of sending segment contacts and the signal impulse lengths are determined by the time of the brush contacts and not by operation of the relays. An additional ring of distributor segments is provided for restoring the relays to the spacing positions, in contradistinction to the marking position, after each operating impulse.

Other objects and features will be found in the following detailed description and appended claims taken in conjunction with the accompanying drawings of which:

Fig. 1 illustrates a preferred embodiment of the present invention used at a sending station; and Fig. 2 shows the invention adapted for use at a repeater station.

Referring to Fig. 1, a plurality of transmitters 11, 12 and 13 which may preferably be of the tape-operated type, are shown arranged to be successively connected in continuous rotation to a distributing device, such as a rotary distributor 14. The segments of distributor 14 are interconnected to form three multiples, one for each of the transmitters. The impulses from one transmitter are respectively interleaved with the impulses from each of the other transmitters. The rotary distributor 14 is connected through a low pass filter 15 designed to suppress the dot and higher frequencies of the signaling current, so that impulses of only two or more units length pass through the filter to a second distributing device, such as rotary distributor 16 which is referred to herein as a storing distributor because it distributes the filtered impulses to groups of storing relays. The storing relays are arranged in three groups, namely, A, B and C, each group responding to the impulses from one of the three transmitters shown. There are two relays in each group, the relays being of the two-element unbiased polarized type which ordinarily permit an armature to remain in either of its two positions until an impulse of the opposite polarity is received. However, these relays of each group are each provided with an additional winding which is arranged to receive after each impulse of signaling current, an impulse of negative polarity from a third distributing device, such as rotary distributor 17 for the purpose of restoring the relays to their normal positions in which they are shown in the drawings. When either of the relays of each group are operated to their alternate positions in response to a signaling current impulse, battery corresponding in polarity to the signaling current impulse is repeated over the armature of the left-hand relay of the group, over a fourth distributing device, such as rotary distributor 18, and duplex arrangement 19 to the cable 20.

Brushes 21, 22, 23 and 24 of rotary distributors 14, 15, 17 and 18 respectively, are driven from a common source of power supply, not shown. Brushes 21 and 22 are in the same phase relation. Brush 24 is out of phase relation with brushes 21 and 22 in that it follows them by an angular distance equal to approximately the length of two segments of distributor 18, which is the equivalent of a unit impulse interval of signaling current, in order to allow one of the storing relays of a group sufficient time to operate to its alternate position before brush 24 engages the corresponding pair of segments of distributor 24. Brush 23 is out of phase with brushes 21 and 22 in that it follows brushes 21 and 22 by an angular distance equal to the length of approximately four segments of distributor 17, and follows brush 24 by an angular distance of two segments of distributor 17. Brush 23 therefore serves to restore the operated storing relay to its normal position immediately after the repeated impulse has been impressed on cable 20.

Cable 20 has a continuous loading of material having a high permeability and low magnetizing force, such as "permalloy" and terminates in a bridged duplex telegraph set having an artificial line 25 equipped with loading coils wound on cores of magnetic material, such as compressed iron dust, "permalloy" dust or the like. The magnetic quality of the cores differs considerably from that of the "permalloy" tape or wire wound on the cable, and therefore an unbalance due to hysteresis is produced between the cable and the artificial line at the beginning of each current impulse transmitted. This unbalance produces a distortion in the incoming signal wave. This distortion becomes particularly troublesome each time the polarity of the signaling current is reversed.

Cable 20 is connected to one side of the duplex bridge arrangement and the artificial line 25, comprising the well known ladder type of network constituted of sections simulating in electrical characteristics different sections of cable 20, is connected to the other side. In the bridge arrangement between conjugate points 26 and 27 is connected shunted receiving condenser 28 in series with transformer 29, the secondary winding of which is connected to a receiver R through two stages 30 and 31 of amplification, a high frequency suppression network or filter 32 and a vibrating relay or interpolating circuit 33.

The cable and artificial line are interconnected at a resistance apex 34 through ratio arms, each of which includes a shunted condenser. A sliding contact arranged to engage the resistance apex 34, is connected to the continuous ring of sending distributor 18.

By means of additional rings (not shown) the tape operated transmitters may be synchronized with the distributors. Any suitable synchronizing system may be employed.

A feature of the invention is the use of the storing relays of groups A, B and C controlled by the rotary distributors, whereby the duration of the impulses impressed on cable 20 is determined by the time that brush 24 is in engagement with the odd numbered segments of distributor 18. This arrangement provides impulses transmitted to cable 20, of a uniform duration. The two storing relays of each group are normally in opposite positions as shown because the grounded negative battery RB is applied, as brush 23 rotates over the segments of distributor 17, to the lower windings of the relays in opposite directions as indicated by the arrows shown in the lower winding. The upper windings of the relays in each group are connected in series to the distributor 16 in one direction. The current in the upper winding of the two relays of a group, in response to a message unit impulse of positive polarity, will be in the direction indicated by the solid line arrows in the upper windings, and in response to message unit impulses of negative polarity, will be in the direction indicated by the dotted line arrows.

*Operation of the system*

Assuming that the distributors are set in operation and that the transmitters 11, 12 and 13 are transmitting messages, the first impulses from the three transmitters will be respectively received over segments Nos. 1, 3 and 5 of distributor 14, the second impulses will be respectively received over segments Nos. 7, 9 and 11, etc. for the remaining impulses. Where these interleaved impulses form pulses of two or more units length, that is, a pulse constituted of adjacent impulses of one polarity, these pulses only, are passed through filter 15 to their corresponding segments of distributor 16. The odd numbered segments only of the four distributors are connected for operation, the even numbered segments are left "dead" to provide "curbing" of signal impulses, a practice often preferred in telegraph systems.

It is assumed that the brushes 21, 22, 23 and 24 are in the position shown and that a unit impulse transmitted by transmitter 13 is the beginning of a long pulse of two or more units length, that is, one that passes through filter 15, and that the first unit of the pulse is received over segment No. 5 of distributor 16. If this impulse be of positive polarity it will pass through the upper windings of relays 41 and 42, in the direction indicated by the solid line arrows shown in the upper row, at a time when no current is flowing in the lower windings. This will cause the armature of relay 41 to engage its left-hand contact and the armature of relay 42 to remain in engagement with its left-hand contact. The engagement of the armatures of both relays 41 and 42 with their respective left-hand contacts prepares a circuit extending from earth 45, armature and left-hand contact of relay 42, negative to positive pole of battery 43, left-hand contact and armature of relay 41 and segment No. 3 of distributor 18. This circuit will be completed when brush 24 engages segment No. 3 of distributor 18 and a positive pulse will be impressed on the resistance apex 34 and then in parallel paths, one of which extends over cable 20 to earth at a distant station, and the other over the artificial line 25 to earth 46.

If the unit impulse received from segment No. 5 of distributor 16, be of negative polarity it will pass through the upper windings of relays 41 and 42 in the direction indicated by the dotted line arrows shown in the lower row. This will cause the armature of relay 42 to engage its right-hand contact and the armature of relay 41 to remain in engagement with its right-hand contact. Consequently a circuit is prepared extending from earth 45, armature and right-hand contact of relay 42, positive to negative pole of battery 43, right-hand contact and armature of relay 41, to segment No. 3 of distributor 18. When brush 24 engages segment No. 3 of distributor 18 the circuit will be completed to transmit a negative impulse over cable 20.

It will be noted therefore that the duration of the impulses impressed on cable 20 is determined by the time the brush 24 is in engagement with an odd numbered segment of distributor 18 and not by the duration of the connection of current supply to the relay contact. This arrangement furnishes impulses to the cable 20, which have a uniform duration.

At the time the brush 22 is in engagement with segment No. 5 of distributor 16, brush 23 will be in engagement with segment No. 1 of the distributor 17 and a circuit is closed from grounded battery RB, the continuous ring, brush 23 and segment No. 1 of distributor 17, conductor 44, through the lower windings of relays 35 and 36 in opposite directions, to earth connection 45. There being no message impulse current flowing in the upper windings of relays 35 and 36, the relays are operated to their normal positions as shown. Thus, distributor 17 serves to restore to normal each pair of relays in turn, in preparation for the next message impulse to be received over the segments connected thereto in multiple.

When brush 22 reaches segment No. 7 of distributor 16, an impulse, that is, the second unit of the long pulse, is received from transmitter 11 and this impulse will be directed through the upper windings of relays 35 and 36. Because of brush 23 having passed over segment No. 1 of distributor 17 as stated above, relays 35 and 36 are both in normal positions at this time and in response to the unit impulse now received over segment No. 7 of distributor 16, either of the relay armatures depending on the polarity of the impulse, will operate to its alternate position to transmit to the cable 20 a unit impulse of the desired polarity as described above for relays 41 and 42.

Relays 38 and 39 of group B operate in the same manner as relays 41 and 42 of group C and relays 35 and 36 of group A, and as long as long pulses are received through filter 15 the relays of groups A, B and C will operate successively. Any group of relays may begin a chain of successive operation of the three groups, the group beginning the chain being the one connected to the multiple of segments of distributor 16 which receives the first unit impulse of a long pulse.

The manner in which the signals transmitted over cable 20 are received and the impulses of dot frequency are interpolated at the distant receiving station is not described herein because it forms no part of the present invention. However, a complete description of these operations may be had by reference to Gilbert Patent 1,753,336, supra.

It may be desirable to repeat the signals transmitted over cable 20 through a repeater station instead of terminating them at a receiving station. In this event the signals are received over cable 20 at a repeater station shown in Fig. 2 wherein a reversal switch 51 for reversing the direction of transmission is provided to route the signals through an amplifier 52 on to a distributor 53. The incoming signals are attenuated during transmission over the cable and are therefore so rounded off that they assume on a graph, the form of a sinusoidal wave. The distributor segments are arranged to select the middle portion of the unit impulses of each received long pulse and to imprsess such portions on their respective storing relays. The relays repeat the regenerated impulses over a distributor 54, conductor 55, through sending network 56, reversing switch 57 to the cable 58. The relays are represented diagrammatically by block 59 in which is also included the distributor for restoring the relays to their normal positions after each unit impulse. The operation of the distributors 53 and 54 and the equipment represented by block 59 is the same as that described above for Fig. 1.

For transmission in the opposite direction, the signals incoming over cable 58 may be repeated over switch 57 in its alternate position, through amplifier 66, storing distributor 60, relays represented diagrammatically by block 61, sending distributor 62, conductor 63, sending network 64, switch 51 in its alternate position, to the cable 20. The block 61 includes, like block 59, storing relays and a restoring distributor.

Any suitable synchronizing arrangement represented by block 65, and adaptable for submarine signaling systems, may be employed.

What is claimed is:

1. In a signaling system, a method which comprises converting a transmitted wave including a frequency corresponding to a given dot frequency into a revised wave constituted solely of impulses of greater average time between voltage changes, effecting a second revision of the transmitted wave to give the impulses of the revised wave a predetermined length, and impressing the wave of impulses of predetermined length upon the outgoing signaling circuit.

2. A signaling system comprising a source of message signal impulses, means for revising the impulse wave transmitted by said source by suppressing all frequencies at and above the dot frequency, means for reproducing the revised wave as a square-topped wave, an outgoing circuit, a rotary device for giving each of the impulses of the reproduced wave a predetermined uniform length for transmission over said circuit.

3. A signaling system comprising a source of message signal impulses, a device for suppressing in the impulse wave transmitted from said source all the frequencies at and above the dot frequency, a second source of signaling impulses, storing elements for regenerating from said second source the signal impulses transmitted through said device and storing said regenerated impulses, and a selector device for selecting certain portions of each of said regenerated impulses successively for transmitting a wave of square-topped form and fewer voltage changes than the wave transmitted from the first mentioned source.

4. A signaling system according to claim 3 wherein the suppressing device is an inductance-capacity network.

5. A signaling system comprising a source of message signal impulses, an inductance-capacity network for suppressing in the impulse wave transmitted from said source all the frequencies at and above the dot frequency, an outgoing circuit, a second source of signaling impulses, and a pair of relaying devices operatively responsive to positive and negative pulses, respectively, transmitted through said network, said relaying devices being arranged to connect said second source of impulses to said outgoing circuit intermittently during each positive and each negative pulse transmitted through said network, to produce a wave for transmission over said outgoing circuit, of square-topped form and of fewer voltage changes than the wave impressed on said network, said square-topped wave constituted of impulses having lengths corresponding to exact multiples of a unit-length impulse.

6. A signaling system according to claim 5, further comprising a circuit for restoring said relaying devices to normal after each impulse of a long positive or long negative pulse transmitted over said outgoing circuit.

7. A signaling system according to claim 5 wherein the means for interconnecting the first mentioned source of signal impulses and said network, said network and said relaying devices, and said relaying devices and outgoing circuit are rotary distributing devices.

8. A signaling system according to claim 5 further comprising a restore circuit including windings of said relaying devices and a rotary distributing device for restoring said relaying devices to normal after each impulse of a long pulse transmitted over said outgoing circuit.

9. A signaling system comprising a plurality of transmitting devices, a rotary distributing device wherein the impulses of one transmitting device are respectively interleaved with the impulses from each of the other transmitting devices, a resistance-inductance-capacity network for suppressing in the wave of interleaved impulses all the frequencies at and above the dot frequency to form a revised wave, a second rotary distributing device connected to said network, a plurality of groups of electromagnetic relays connected to said second distributing device, each group responsive to the impulses from one transmitting device, a regenerating source of impulses for each of said transmitting devices controlled by the relays of each group, an outgoing circuit, a third rotary distributing device for connecting each of said regenerating sources in turn to said outgoing circuit and a fourth rotary distributing device for interrupting the connection of said regenerating source to the outgoing circuit at regular intervals to impress on said outgoing circuit a wave of square-topped form and of fewer voltage changes than the wave impressed on said network, said square-topped wave being constituted of impulses having lengths corresponding to exact multiples of a unit-length impulse.

In witness whereof, I hereunto subscribe my name this 29th day of July, 1931.

EVERETT T. BURTON.